United States Patent [19]
Kita

[11] Patent Number: 5,852,401
[45] Date of Patent: Dec. 22, 1998

[54] DISTRESS MESSAGE SIGNAL SENDING DEVICE

[75] Inventor: Kazunori Kita, Tokyo, Japan

[73] Assignee: Casio Computer Co., Ltd., Tokyo, Japan

[21] Appl. No.: 880,909

[22] Filed: Jun. 23, 1997

[30] Foreign Application Priority Data

Jun. 27, 1996 [JP] Japan .................................. 8-167790

[51] Int. Cl.⁶ ................................................ G08B 1/08
[52] U.S. Cl. .................... 340/539; 340/573; 340/521; 340/522; 340/825.36; 340/825.49; 340/604; 342/357
[58] Field of Search ..................... 340/539, 521, 340/573, 522, 990, 989, 984, 574, 540, 825.36, 825.45, 825.49, 604, 665; 342/357, 450, 457, 126

[56] References Cited

U.S. PATENT DOCUMENTS

| | | | |
|---|---|---|---|
| 5,650,770 | 7/1997 | Schlager et al. | 340/539 |
| 5,652,570 | 7/1997 | Lepkofker | 340/573 |

*Primary Examiner*—Jeffery A. Hofsass
*Assistant Examiner*—Daryl C. Pope
*Attorney, Agent, or Firm*—Frishauf, Holtz, Goodman, Langer & Chick

[57] ABSTRACT

In a wristwatch type distress message sending device worn by the user, a positional information generator receives GPS signals sent by a plurality of GPS satellites and generates positional information on the latitude and longitude of the position of the user. When the user meets a disaster, a distress message signal generator generates a distress message signal containing the positional information generated by the positional information generator. A sender then sends out the distress message signal by radio.

12 Claims, 4 Drawing Sheets

DISTRESS MESSAGE SIGNAL SENDING DEVICE

BACKGROUND OF THE INVENTION

1. Field of the Invention

The present invention relates to distress message signal sending devices, and more particularly to a device which includes means for calculating the present position of the device, using GPS (Global Positioning System) satellites, and, when a user meets with a disaster, automatically sends a distress signal including information on the position of the disaster.

2. Description of the Prior Art

In recent marine transportation, the marine accidents of ships for business use are decreasing because of improvements of the performance of radio devices, radars and navigation systems installed in the ships. In contrast, the number of disasters in marine leisure has rapidly increased as marine sports using, for example, pleasure boats such as small yachts and/or motor boats, and windsurfing, diving, etc., have spread.

Thus, small ships such as small cruising yachts navigable in the open sea are bound to mount thereon a distress message sending device called an EPIRB (Emergency Position Indicating Radio Beacon).

An EPIRB is thrown onto the sea as a buoy in a disaster or provided in a lifeboat to send a "distress message signal" or a "ship identification code" from the victim toward a search boat or a terrestrial station to home the position of the victim. Recently, a satellite EPIRB which sends a distress message signal generated from the EPIRB via a satellite which moves around in a low orbit or a geostationary orbit satellite to the terrestrial station has been put to practical use.

Such conventional distress signal sending devices are necessarily large, weighty and not suitable for portage because they contain an automatic message sending mechanism/automatic floating mechanism operated when they are thrown onto the sea. A rescue party must search for the position of the disaster or victim because the distress message signal sent by the sending device contains no information on the position of the disaster.

SUMMARY OF THE INVENTION

It is therefore an object of the present invention to provide a portable distress message signal sending device of the type suitable for leisure use which sends a distress message signal including information on the position of the disaster.

In order to achieve the above object, the present invention provides a distress message sending device comprising:

positional information generating means for receiving GPS signals sent by a plurality of GPS satellites and for generating positional information on the latitude and longitude of the position of the distress message sending device on the earth;

distress message signal generating means responsive to the occurrence of a disaster for generating a distress message signal containing the positional information generated by the positional information generating means; and sending means for sending the distress message signal by radio.

According to such arrangement, the sending device is highly suitable for portage and ensures sending a distress signal infallibly.

DESCRIPTION OF THE PREFERRED EMBODIMENT

The inventive distress message sending device is applicable to portable terminals such as wristwatches and personal digital assistants. One embodiment of the inventive distress message sending device will be described next with reference to the accompanying drawings.

A. Outline

Figure 1:
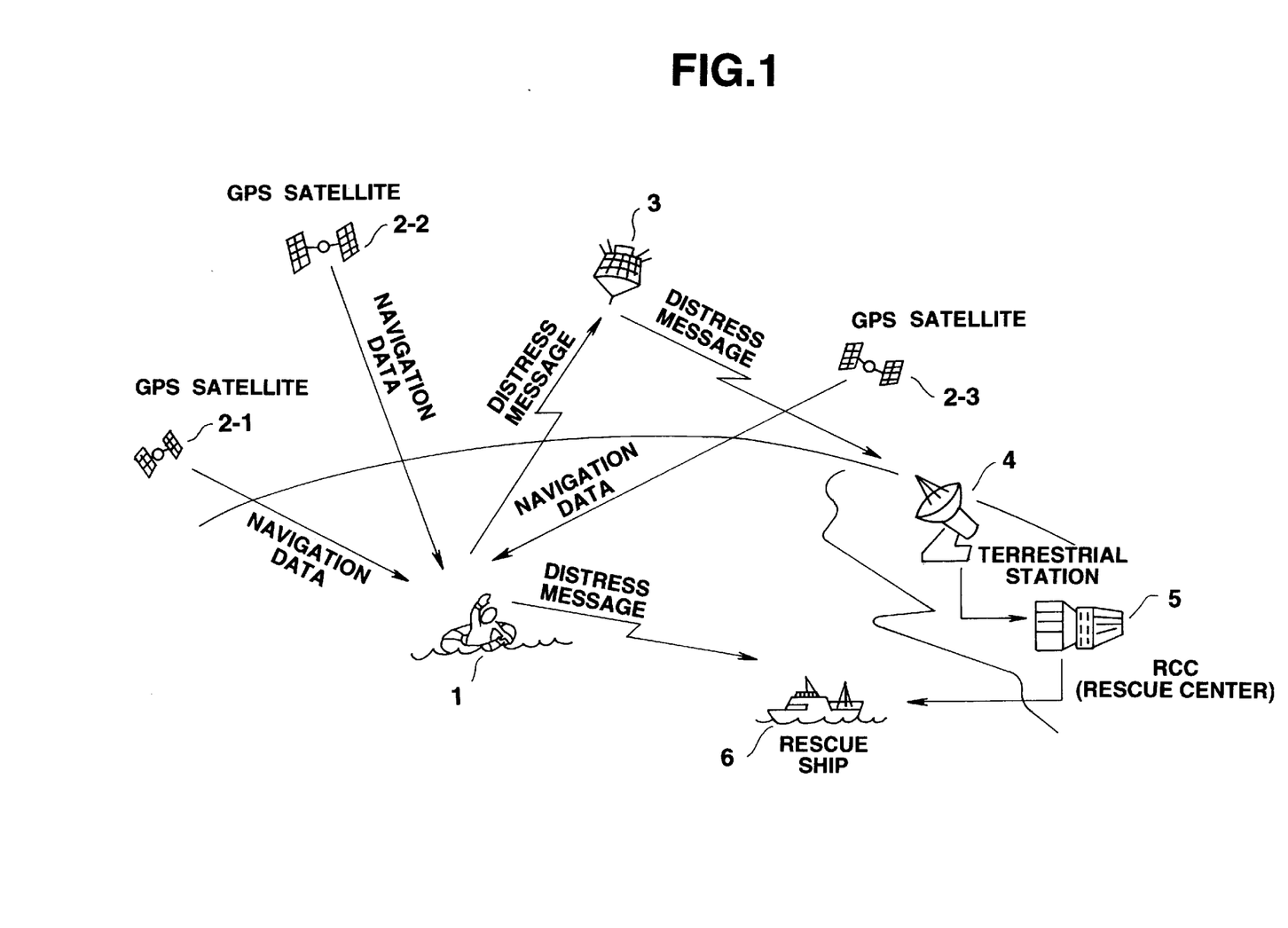
FIG. 1 outlines a rescue message sending system using an embodiment of a wristwatch type distress message signal sending device according to the present invention.

FIG. 1 outlines a rescue message sending system employing the inventive wristwatch type distress message sending device. In FIG. 1, reference numeral 1 denotes a victim who wears the inventive wristwatch-type sending device, which receives navigation data from GPS satellites 2-1 to 2-3 which constitute a GPS, generates positional information representing the latitude and longitude of the position of the disaster on the earth, and sends out by radio a distress message signal containing the positional information.

The distress message signal sent out by the victim's sending device is picked up by a terrestrial station 4 on the earth via a satellite 3 which moves around the earth in a low orbit. The distress message signal received by the terrestrial station 4 is transferred to a rescue center (RCC) 5, which extracts the positional information and the victim identification code contained in the distress message signal and sends them to a rescue ship 6.

The rescue ship 6 rushes to the scene of the disaster on the basis of the received information on the position of the disaster (latitude and longitude) from the RCC 5. When the rescue ship 6 reaches an area where the distress message signal from the victim 1 is directly receivable, it directly receives the distress message signal, grips the present position of the disaster or the victim (latitude and longitude), and then goes to the victim's rescue. Thus, the rescue ship 6 is able to rescue the victim 1 even when the victim 1 is drifted to a position deviating some extent from the position of the disaster reported by the distress message signal via the satellite.

B. Appearance

Figure 2:
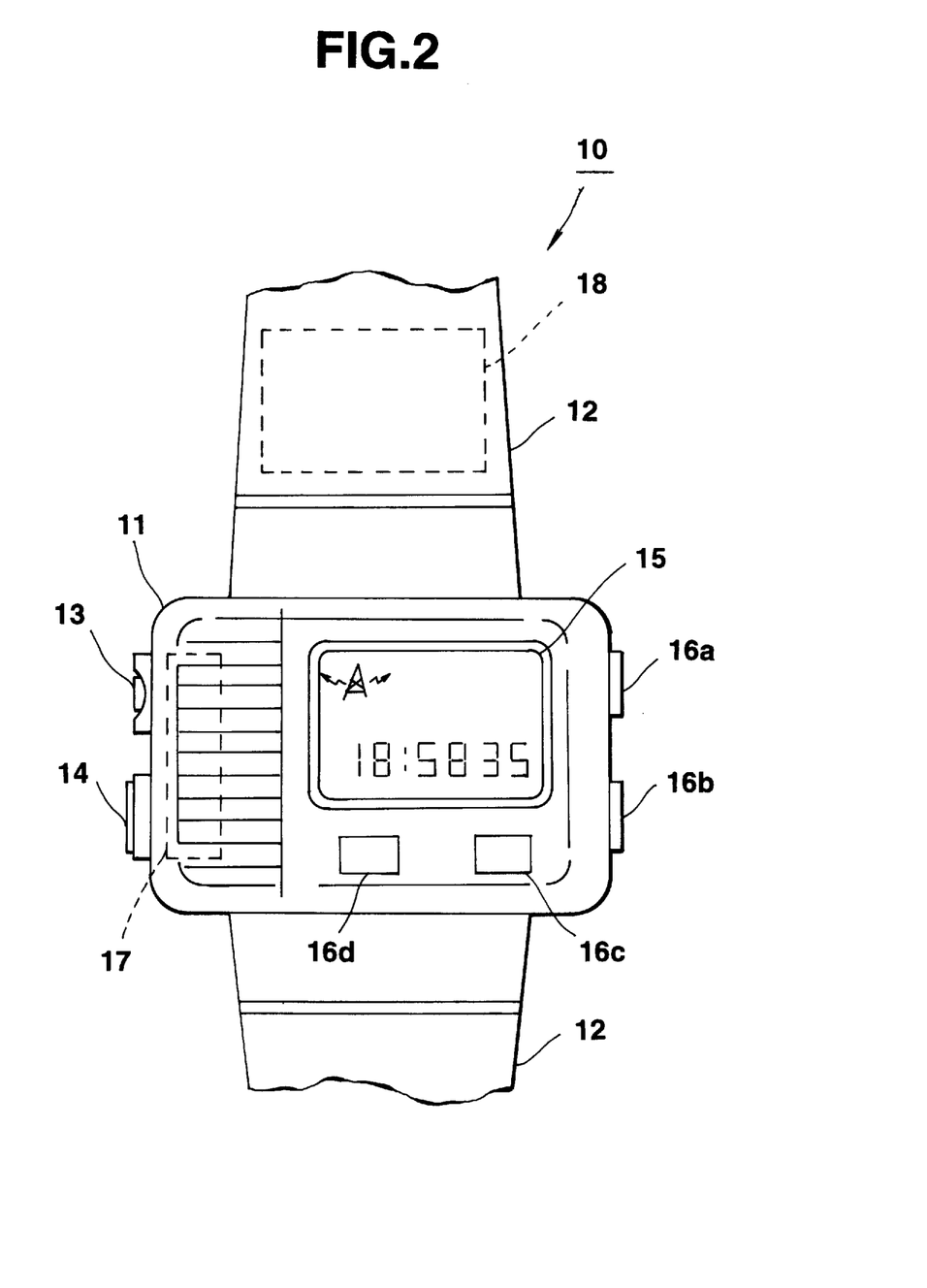
FIG. 2 shows the appearance of the wristwatch type embodiment.

Referring to FIG. 2, the appearance of the wristwatch type distress message sending device 10 will be described. In FIG. 2, reference numeral 11 denotes a watch body; 12, a wristband connected to the watch body 11; and 13, a manual send switch (MSS). When the manual send switch 13 was turned on, a helical sending antenna 17 contained in the body 11 sends a distress message signal by radio.

Figure 3:
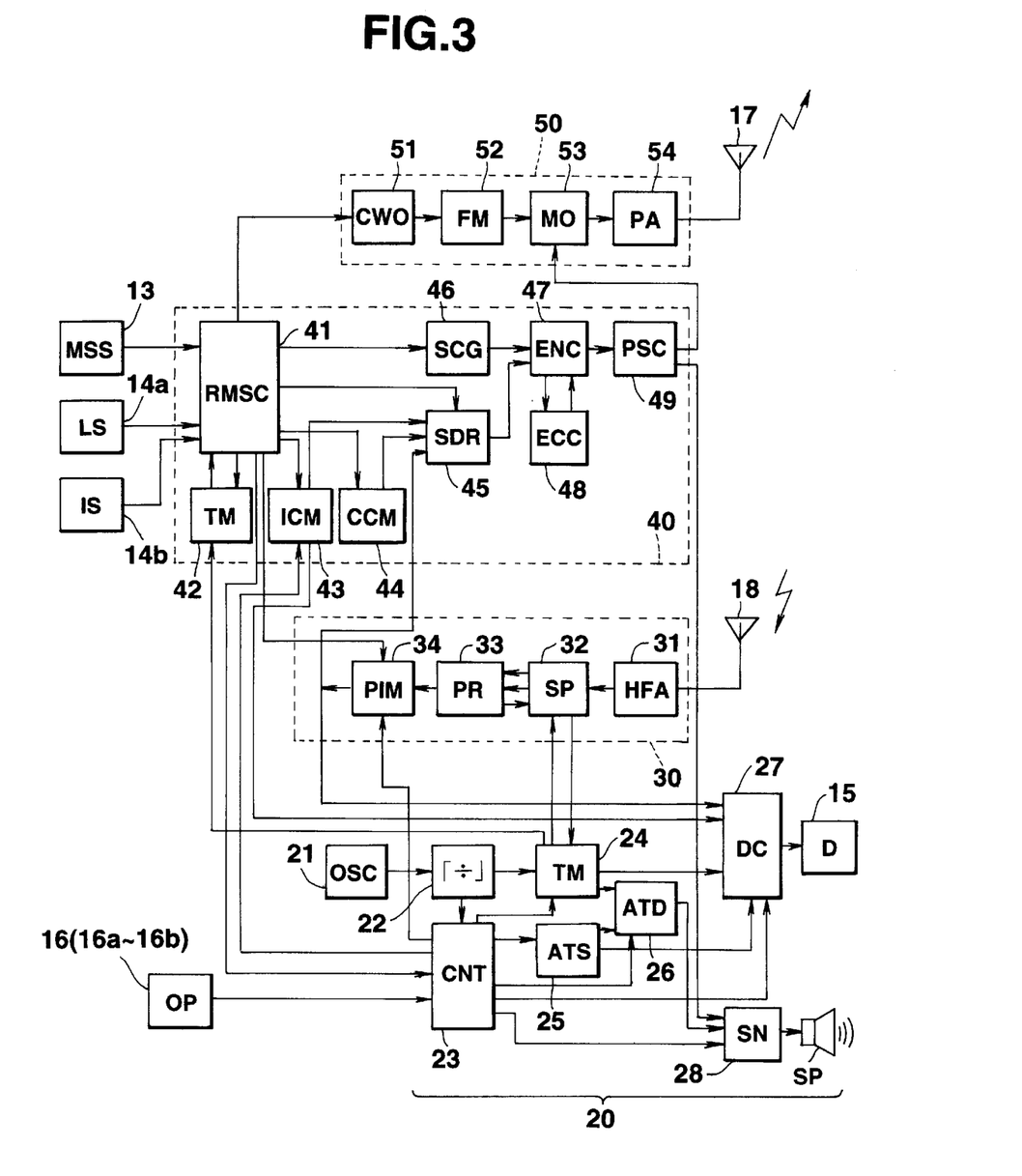
FIG. 3 is an electrical block diagram of the wristwatch type embodiment.

Reference numeral 14 denotes an automatic send sensor which is composed of a landing sensor (LS) 14a and an impact sensor (IS) 14b of FIG. 3. When both the sensors 14a and 14b are turned on, the antenna 17 automatically sends a distress message signal by radio.

More specifically, the landing sensor 14a senses that it is in the water by detecting conduction occurring between a pair of normally spaced contacts (not shown) or a reduction in the resistance value between a pair of contacts (not shown) normally set at an electrically high resistance value.

The impact sensor 14b senses an impact acceleration, using a cantilever type piezoelectric element (not shown). When the both sensors 14a and 14b sense the "landing" and "impact", respectively, simultaneously in a short time, the sending device 10 is instructed to send a distress message signal.

Reference numeral 15 denotes a display (D) of a liquid crystal panel which displays time such as the present time, date, alarm time and timer time, as well as the operation modes of the device 10 which point to a distress message signal sending mode depending on the turning on operation of the manual send switch 13 or the automatic send sensor 14, and a GPS receipt mode.

Reference numerals 16a–16d denote operation switches which constitute an operation input (OI) unit wherein 16a denotes a GPS switch which sets/stops the GPS receipt mode; 16b, a switch which generates/stops an alarm sound and a stopwatch; 16c, a time/date/alarm time setting switch; and 16d, an operation mode changeover switch.

Reference numeral 18 denotes a GPS receipt antenna (for example, a planar antenna such as a microstrip antenna) spread within the wristband 12 and receives navigation data (clock data) from the GPS satellites 2-1 to 2-3 (FIG. 1).

C. Structure

Referring to FIG. 3, the electrical structure of the embodiment will be described. In FIGS. 3 and 2, similar elements are identified by the same reference numeral and their further description will be omitted.

The sending device 10 of the present embodiment is mainly classified into a time measuring unit (timepiece circuit) 20, a GPS receiver 30, a distress message signal generator 40 and a sender 50. The structures of those elements will be described next.

(1) Time Measuring Unit 20

The time measuring unit 20 is composed of elements 21–28 to generate data on a date/time/alarm time/timer time.

In the time measuring unit 20, reference numeral 21 denotes an oscillator which outputs an original oscillatory clock signal, and reference numeral 22 denotes a frequency divider which divides the oscillatory clock signal into an operation clock signal and a time measuring clock signal. The operation clock signal is used as a system clock for a control (CNT) circuit 23 whereas the time measuring clock signal is fed to a time measuring (TM) circuit 24.

The control circuit 23 is composed of a CPU, ROM and RAM and sets/corrects the time in the time measuring unit 20, and controls the GPS receiver 30 and the distress message signal generator 40 which will be described later in more detail, by feeding control signals to those elements so that those elements are placed in operation modes corresponding to switch inputs entered by the switches 16a–16d.

The time measuring unit 24 records the present time and date on the basis of the time measuring clock signal.

Reference numeral 25 denotes an alarm time setting (ATS) circuit in which an alarm time is set in accordance with an alarm time setting command outputted by the controller 23 in correspondence to the operation of the switch 16c. Reference numeral 26 denotes an alarm time detector (ATD) which outputs an alarm sound generation specifying signal which specifies the generation of an alarm sound when the present time coincides with the set alarm time.

Reference numeral 27 denotes a display control (DC) circuit which controls the display of the display 15. The display control circuit 27 changes the contents and aspect of the display in accordance with an operation mode command given by the control circuit 23. For example, in the time measuring mode, the display control circuit 27 displays the present time and date on the display 15 whereas in the alarm time setting mode, it displays an alarm time to be set. In the GPS receipt mode, it displays the latitude and longitude of the present position on the earth obtained in the GPS receipt. In a distress message signal setting mode, an identification code is displayed depending on the distress message signal setting operation.

Reference numeral 28 denotes a sounding (SN) circuit which generates an alarm sound from a speaker SP on the basis of an alarm sound generation specifying signal from the alarm time detector 26 or an alarm sound when a distress message signal is sent in accordance with a command from the distress message signal generator 40. The generation of the alarm sound is stopped by a command from the control circuit 23.

(2) GPS receiver 30

The GPS receiver 30 is composed of elements 31–34 and receives navigation data from GPS satellites 2-1 to 2-3, and produces and stores positional information (latitude and longitude).

The receiver 30 operates, for example, at intervals of one hour depending on a periodic signal from the time measuring circuit 24 which occurs at intervals of one hour and the present positional information is updated at intervals of one hour. As the periodic signal, a signal having a different period may be used, which is a matter of choice. Alternatively, the receiver 30 may be operated when any switch of the operation switch unit 16 is operated.

Reference numeral 31 denotes a high frequency amplifier (HFA) which receives and amplifies a signal fed from the GPS receipt antenna 18, converts the signal to an intermediate frequency signal, and provides the intermediate frequency signal to the next stage.

Reference numeral 32 denotes a signal processor (PR) which demodulates the intermediate frequency signal in the spread spectrum direct sequence method to produce navigation data. The signal processor 32 extracts information on the respective orbits of the GPS satellites 2-1 to 2-3 received at present on the basis of the produced navigation data and clock data sent by the satellites 2-1 to 2-3. Reference numeral 33 denotes a calculation (CAL) circuit which calculates the latitude and longitude of the present position of the device 10 on the earth on the basis of the orbit information and clock data from the signal processor 32.

More specifically, the longitude and the latitude of the present position of the device 10 on the earth is calculated by the three-point distance measurement method (triangulation) based on the respective positions of the satellites 2-1 to 2-3 on their orbits different in orbit inclination angle and the distance between the position of the device 10 on the earth and each of the GPS satellites obtained from the clock data.

When only the latitude and longitude of the present position are calculated, navigation data are required to be received from at least two GPS satellites. The latitude and longitude of the victim's position, the height of the position of the present device 10 which receives the navigation data, and an azimuth where the present device 10 is moving if this occurs can be specified from navigation data fed by three GPS satellites.

Reference numeral 34 denotes a positional information memory (PIM) which stores data on the latitude and longitude of the present position of the device 10 on the earth calculated by the calculation circuit 33, whose data are read and set by the control circuit 23 in the display control circuit 27 to thereby to be displayed on the display 15.

(3) Distress Message Signal Generator 40

The distress message signal generator 40 is composed of elements 41–49 and generates a distress message signal containing the positional information (the latitude and longitude of the device's position) produced by the GPS receiver 30 on the basis of the turning-on operation of the manual send switch 13 or the automatic send sensor 14.

In the distress message signal generator 40, reference numeral 41 denotes a distress message sending control (RMSC) circuit which when the turning-on operation of the manual send switch 13 is sensed or both the landing sensor 14a and impact sensor 14b are turned on, generates signals which control the respective elements of the generator 40, and instructs the sender 50 to perform carrier oscillation.

Reference numeral 42 denotes a timer (TM) circuit which generates a timer signal to specify sending a distress message signal at predetermined intervals of time on the basis of a timer time signal received from the time measuring circuit 24. In response to the timer signal, the distress message sending control circuit 41 instructs the relevant elements to perform operations required for generation of the distress message signal.

Reference numeral 43 denotes an identification code memory (ICM) in which an entered identification code is written by the control circuit 23 and from which the identification code is read in accordance with instructions from the distress message signal sending control circuit 41 when the distress message signal is generated. The identification code points to data representing the attributes of the victim such as, for example, the name of the ship.

Reference numeral 44 denotes a communication code memory (CCM) which stores a communication code beforehand, which is read in accordance with the instructions from the distress message sending control circuit 41 when the distress message signal is generated. The communication code is data representing the type of a disaster.

Reference numeral 45 denotes a send data register (SDR) in which "identification code", "communication code" and "positional information" read from the identification code memory 43, communication code memory 44 and positional information memory 34, respectively, in accordance with read instructions from the distress message sending control circuit 41 are stored. The "identification code", "communication code" and "positional information code" set in the send data register 45 constitute the distress message signal. Reference numeral 46 denotes a synchronization code generator (SCG) which generates a synchronization code which is the header of the distress message signal.

The "synchronization code", "identification code", "communication code", and "positional information" outputted from the synchronization code circuit 46 and the send data register 45 in accordance with send instructions outputted by the distress message sending control circuit 41 are delivered to an encoder (ENC) 47, which generates a distress message signal encoded in a predetermined format.

Reference numeral 48 denotes an error check code generator (ECS) which adds an error check code such as a CRC (Cyclic Redundancy Check) code, obtained by performing a generating function operation on the distress message signal encoded in the predetermined format by the encoder 47, to the encoded distress message signal. Thus, a distress message signal is formed which is composed of the "synchronization code", "identification code", "communication code", "positional information", and "error check code".

Reference numeral 49 denotes a parallel/serial converter which converts a parallel-type distress message signal outputted by the encoder 47 to serial data. When the parallel/serial converter 49 has performed such parallel-serial conversion, it instructs the reporting sound circuit 28 to generate a sound to report that the parallel/serial conversion was performed.

(4) Sender 50

The sender 50 is composed of elements 51–54 and modulates the distress message signal in accordance with instructions to perform carrier wave oscillation from the distress message sending control circuit 41, and sends the modulated distress message signal by radio.

In the sender 50, reference numeral 51 denotes a carrier wave oscillator (CWO) which performs a carrier wave oscillation in accordance with instructions from the distress message sending control circuit 41; 52, a frequency multiplier (FM) which multiplies the carrier wave fed from the preceding stage to provide a predetermined increased-frequency signal; 53, a modulator (MO) which modulates the increased-carrier wave depending on the contents of the distress message signal; and 54, a power amplifier which amplifies the power of the modulated carrier wave (distress message signal) and sends it from the helical sending antenna 17.

(5) Flow Chart

Figure 4:
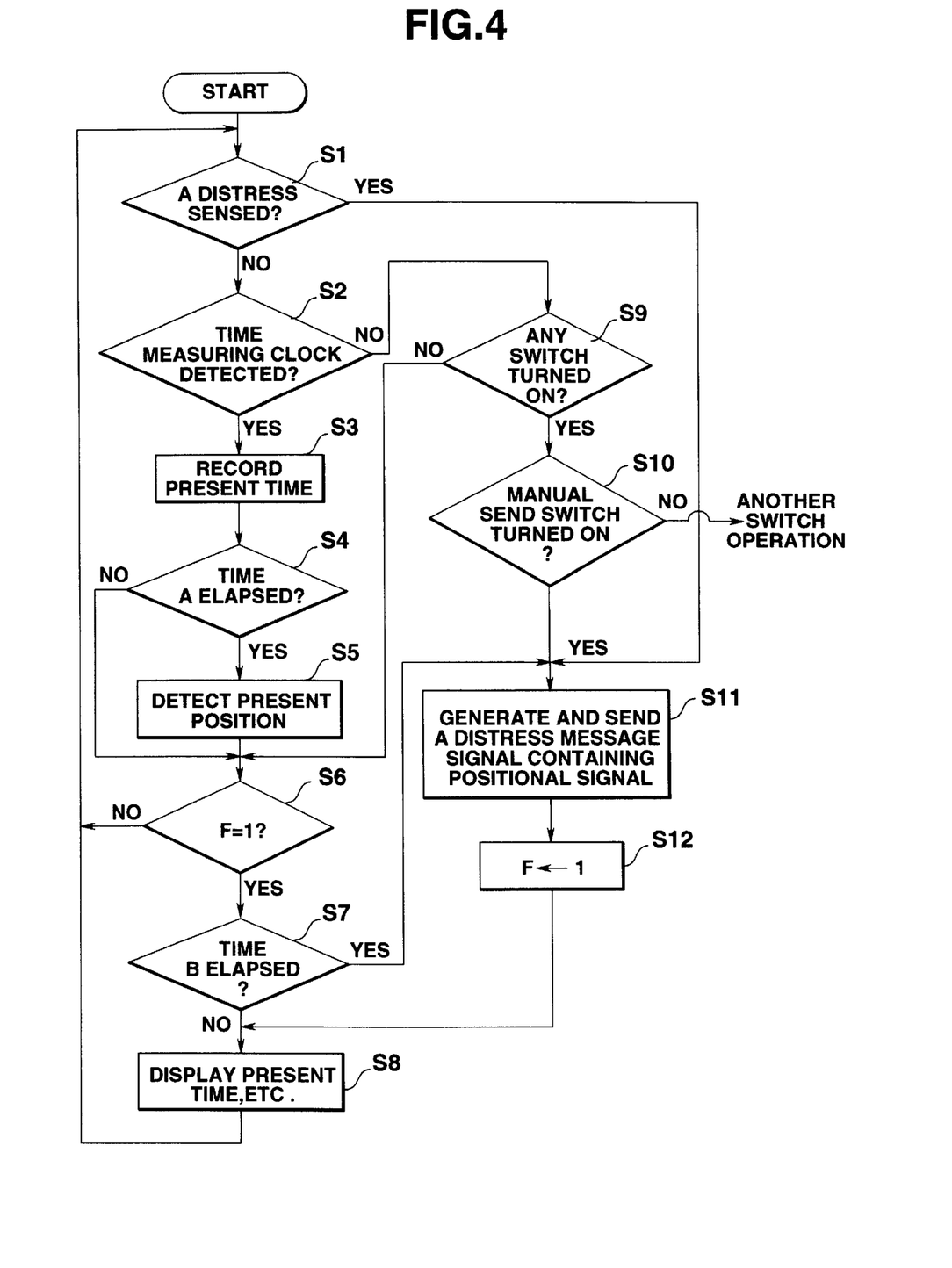
FIG. 4 is a flow chart of a main process performed by the wristwatch type embodiment.

FIG. 4 shows a flow chart of a main process performed by the inventive wristwatch sending device 10 in which reference character F denotes a flag indicative of whether a disaster has occurred. In the disaster, "1" is set in the flag F.

First, it is determined whether the landing sensor 14a and/or the impact sensor 14b of the automatic send sensor 14 have sensed a disaster, by detecting the conditions of the landing and impact sensors 14a and 14b of the automatic sending sensor 14 (step S1). If not, at step S2, a time measuring clock signal which records the present time is detected from the frequency divider 22. When the time measuring clock signal is generated from the frequency divider 22, the present time is recorded at step S3. It is then determined at step S4 whether a predetermined time A has elapsed, at predetermined intervals of time for detecting the distress position. Each time the predetermined time A (one hour) elapses, the latitude and the longitude of the present position on the earth is detected and data representing the detected latitude and longitude of the present position are produced at step S5.

At step S6, it is determined whether the flag F is 1. If so (a disaster has occurred at present), control passes to step S7, which determines whether a predetermined time B has elapsed, to send a distress message signal at predetermined intervals of time. If so, a distress signal containing the positional information is generated and sent by the sender 50 to the outside at step S11. Control then passes to step S12, which sets flag F at 1. The present time is then displayed at step S8.

When the landing sensor 14a and/or the impact sensor 14b of the automatic send sensor 14 detect the distress at step S1, control passes to step S11 which generates a distress signal containing the positional information and the sender 50 sends it to the outside. Then, at step S12, the flag F is set at 1 to indicate the occurrence of the disaster. Thus, the distress signal is then generated at predetermined intervals of time and the sender 50 sends the generated distress signal to the outside at steps S6 and S7.

When any switch is turned on and NO is determined at step S2, control then passes to step S9, which detects that the switch has been turned on. Control then passes to step S10, which determines whether the manual send switch 13 is turned on, and if so, determines that the disaster has occurred. Thus, at step S11, the distress signal is generated and sent by the sender 50 to the outside, as described above. At step S12, the flag F is set at 1 to indicate the occurrence of the disaster.

As described above, the positional information is detected at predetermined intervals of time. When the conditions that the disaster has occurred and the distress message must be sent are recognized by the operation of the automatic sending sensor 14 or the manual sending switch, the distress message signal containing the positional information is sent to the outside at the predetermined intervals of time.

The sending device of the present embodiment is integral with the wristwatch, so that it may be worn on a wrist at all times without a feeling of wrongness and hence it is very suitable for portage. Since in the sending device information on the latitude and longitude of the present position on the earth detected by the GPS receiver 30 is added to the distress message signal, a rapid search and rescue can be performed, for example, even when the victim falls from the cruising ship into the sea and drifted.

According to the present embodiment, even when the victim is unconscious and cannot turn on the send switch 13 by himself or herself, the automatic send sensor 14 is automatically turned on when the victim falls into the sea. Thus, the distress message signal generator 40 automatically generates a distress message signal containing information on the victim's position.

While in the present embodiment the GPS receipt antenna 18 spread in the wristband 12 and the helical send antenna 18 contained in the watch body 11 are provided separately, the GPS receipt antenna 18 (plane antenna) provided in the wristband 12 may function also as an antenna for sending out the distress message signal. Alternatively, a helical whip antenna may be provided so as to extend from the watch body 11 for sending/receiving purposes.

The present embodiment is effective as a portable navigation device using the GPS receipt function. For example, the present embodiment is usable in a rally in which the racers travel across a desert area where no definite roads are built or in a mountain orientation. The present device is effective not only in marine accidents but also in accidents mountain climbing, by using means for sensing a change in height which exceeds a threshold or means for sensing impact which exceeds a threshold, in place of the automatic send sensor 14.

What is claimed is:

1. A portable distress message sending device for informing a rescue side of a fact of a disaster, comprising:
    positional information generating means for receiving GPS signals sent by a plurality of GPS satellites on the earth at a position of the portable distress message sending device, and generating positional information on the latitude and longitude of the position of the portable distress message sending device on the earth;
    a plurality of sensors each for sensing a respective different one of aspects of a state of the portable distress message sending device;
    distress message signal generating means, responsive to at least two of said plurality of sensors sensing corresponding respective different aspects of the state of the portable distress message sending device, for generating a distress message signal containing the positional information generated by said positional information generating means; and
    sending means for sending the distress message signal by radio out of the portable distress sending device.

2. The portable distress message sending device according to claim 1, wherein said distress message signal generating means comprises intermittent signal generating means for generating the distress message signal containing the positional information at predetermined intervals of time after the generation of the distress message signal.

3. The portable distress message sending device according to claim 1, wherein the portable distress message sending device is provided in a wristwatch type case which contains a timepiece circuit for recording and displaying a present time.

4. The portable distress message sending device according to claim 1, wherein said plurality of sensors comprises:
    a landing sensor for sensing landing of the portable distress message sending device on water; and
    an impact sensor for sensing impact on the portable distress message sending device, and
    wherein the predetermined aspects of the state of the portable distress message sending device comprise an aspect in which said landing sensor indicates that the portable distress message sending device has sufficiently landed on the water, and an aspect in which said impact sensor indicates that the portable distress message sending device has received sufficiently strong impact.

5. A distress message sending method of informing a rescue side of a fact of a disaster, using a distress message sending device, the method comprising:
    receiving at a position on the earth GPS signals sent by a plurality of GPS satellites;
    generating positional information on the latitude and longitude of the position on the earth, based on the received GPS signals;
    sensing respective different aspects of a user's state, at the position on the earth, with a plurality of sensors;
    generating a distress message signal containing the generated positional information in response to at least two of the plurality of sensors sensing corresponding different respective aspects of the user's state; and
    sending the distress message signal by radio toward a rescue side.

6. The method according to claim 5, comprising intermittently generating subsequent distress message signals containing the positional information at predetermined intervals of time after generation of the distress message signal.

7. The method according to claim 5, wherein said step of sensing comprises:
    sensing, with a landing sensor, landing of the distress message sending device on water; and
    sensing, with an impact sensor, impact on the distress message sending device, and
    wherein the respective aspects of the state of the user comprise an aspect in which it is sensed by said landing sensor that the distress message sending device has sufficiently landed on the water, and an aspect in which it is sensed by said impact sensor that the distress message sending device has received a sufficiently strong impact.

8. The method according to claim 5, comprising providing said distress message sending device in a portable unit.

9. The method according to claim 5, comprising providing said distress message sending device in a wristwatch device which contains a timepiece circuit for recording and displaying a present time.

10. A computer readable program recording medium having stored thereon a program for enabling a computer to operate as the following elements of a portable distress message sending device for informing a rescue side of a fact of a disaster:

generating means for receiving GPS signals sent by a plurality of GPS satellites on the earth at a position of the portable distress message sending device, and generating positional information on the latitude and longitude of the position of the portable distress message sending device on the earth;

means for causing a plurality of sensors each to sense a respective different one of aspects of a state of the portable distress message sending device;

means responsive to a least two of said plurality of sensors sensing corresponding respective different aspects of the state of the portable distress message sending device, for generating a distress message signal containing the positional information generated by said generating means; and means for sending the distress message signal by radio out of the portable distress message sending device.

11. The computer readable program recording medium according to claim 10, wherein:

distress message signals containing the positional information are intermittently generated at predetermined intervals of time after generation of the distress message signal.

12. The computer readable program recording medium according to claim 10, wherein said means for causing comprises:

causing sensing of landing of the distress message sending device on water by a landing sensor; and causing sensing of impact on the distress message sending device by an impact sensor, and wherein the respective aspects of the state of the user comprise an aspect in which it is sensed by said landing sensor that the distress message sending device has sufficiently landed on the water, and an aspect in which it is sensed by said impact sensor that the distress message sending device has received a sufficiently strong impact.

* * * * *

UNITED STATES PATENT AND TRADEMARK OFFICE
CERTIFICATE OF CORRECTION

PATENT NO. : 5,852,401
DATED : December 22, 1998
INVENTOR(S) : Kazunori KITA

It is certified that error appears in the above-identified patent and that said Letters Patent is hereby corrected as shown below:

In the Title page, Item [56] References Cited, under "U.S. PATENT DOCUMENTS" insert

--5,043,736  8/1991  Darnell et al  342/357

5,552,772  9/1996  Janky et al   340/573--.

Signed and Sealed this

Twenty-ninth Day of February, 2000

Attest:

Q. TODD DICKINSON

Attesting Officer

Commissioner of Patents and Trademarks